United States Patent [19]
Beneteau et al.

[11] Patent Number: 5,978,746
[45] Date of Patent: Nov. 2, 1999

[54] METHOD AND APPARATUS FOR DETERMINING A PHYSICAL PARAMETER REPRESENTED BY VARIATION IN TIME OF A PHYSICAL MAGNITUDE

[75] Inventors: Lionel Beneteau, Montrouge; Olivier Boubal, Ecully; Jacques Oksman, Antony, all of France

[73] Assignee: Schlumberger Industries, S.A., Montrouge, France

[21] Appl. No.: 08/376,975

[22] Filed: Jan. 23, 1995

[30] Foreign Application Priority Data

Feb. 1, 1994 [FR] France .................................. 94 01086

[51] Int. Cl.⁶ .................................................. G05B 21/02
[52] U.S. Cl. ............................ 702/128; 702/79; 702/193; 364/178; 364/179
[58] Field of Search .............................. 702/128, 12, 45, 702/46, 48, 50, 51, 54, 55, 79, 80, 100, 103, 124, 125, 176, 178, 187, 193; 364/178, 179, 528.16, 17, 528.31, 528.34, 528.35; 324/306; 73/1.16, 1.35, 1.36, 1.73, 1.74, 19.04, 23.24, 23.25, 592, 602, 622, 149, 152.18, 152.19, 152.21, 152.25, 152.23, 152.29, 152.45, 152.55, 861, 861.02, 861.03, 861.05, 861.06, 861.18, 861.19, 861.356, 196, 197, 204.14, 861.43, 861.49, DIG. 5, DIG. 8, 863.03, 863.02

[56] References Cited

U.S. PATENT DOCUMENTS

| | | | |
|---|---|---|---|
| 4,215,413 | 7/1980 | Stark et al. | 702/80 |
| 4,254,470 | 3/1981 | Jordan | 702/46 |
| 5,608,647 | 3/1997 | Rubsamen et al. | 364/528.17 |

FOREIGN PATENT DOCUMENTS

| | | | |
|---|---|---|---|
| 0019672 | 10/1980 | European Pat. Off. | |
| 0201296 | 12/1986 | European Pat. Off. | |
| 405209770 | 8/1993 | Japan | 73/861.43 |
| 2068532 | 12/1981 | United Kingdom | |

Primary Examiner—Hal Wachsman
Attorney, Agent, or Firm—Leonard W. Pojunas

[57] ABSTRACT

A physical parameter represented by variation in time of a physical magnitude G capable of varying between a minimum value $G_{min}$ and a maximum value $G_{max}$ is determined. The physical magnitude G is measured at variable time intervals referred to as sampling times. After each measurement of the physical magnitude G, the corresponding value of the physical parameter, and also the theoretical maximum error that could have occurred in the determination of the physical parameter are determined. The sampling time prior to each new measurement of the physical magnitude G is determined in such a manner as to ensure that a predetermined error threshold $E_{max}$ is not exceeded while determining the value of the physical parameter corresponding to the new measurement of the physical magnitude G.

14 Claims, 7 Drawing Sheets

METHOD AND APPARATUS FOR DETERMINING A PHYSICAL PARAMETER REPRESENTED BY VARIATION IN TIME OF A PHYSICAL MAGNITUDE

The present invention relates to a method of determining a physical parameter represented by variation in time of a physical magnitude G that is capable of varying between a minimum value $G_{min}$ and a maximum value $G_{max}$.

BACKGROUND OF THE INVENTION

In numerous industries, and in particular in the field of volumetric fluid metering, there exists a need to determine a physical parameter represented by variation in time of a physical magnitude G, said physical parameter representing, for example, the integral of a physical magnitude such as the flow rate of a fluid, in which case the parameter corresponds to the volume of fluid.

Certain measurement systems rely on the principle whereby direct access is provided to the integral of the physical magnitude, but not to the instantaneous value of said physical magnitude.

However, such systems are being ever more frequently modified for the purpose of integrating new functions that require knowledge of the instantaneous value of the physical magnitude, and to do this, appropriate electronic means are added thereto, specifically for the purpose of converting analog signals into digital signals and for performing processing on said digital signals.

Thus, in modified measurement systems, the physical parameter representing the integral V of a physical magnitude G is no longer directly obtained, but is determined by a method of the following type: at instant t, the physical magnitude G representative of a certain state is measured and processed by a data acquisition and processing system which may, for example, comprise one or more sensors together with means for processing the signal delivered by the sensor(s) (amplifier, analog-to-digital converter, . . . ), thereby providing an estimated value $G_m(t)$ of the physical magnitude G at instant t, which value is also referred to as an "estimator". Digital processing then makes it possible to determine the physical magnitude, i.e. the time integral $V_m$ of the estimator $G_m$ at instant t, $V_m(t)=V_m(t-1)+G_m(t)\Delta t$ where $V_m(t-1)$ represents the time integral of the estimator $G_m$ at instant $(t-1)$, and where $\Delta t$ represents the fixed time interval between two successive instants at which the integral $V_m$ of the estimator $G_m$ has been determined. After the integral $V_m$ has been computed and stored, the measurement system waits for a period $\Delta t$ before estimating a new value of the physical magnitude G. The steps mentioned above are then repeated over time.

Unfortunately, the Applicant has observed that variations in time of the physical magnitude G are separated by periods during which the magnitude G varies little or not at all.

The above considerations lead to adapting the time interval between two instants at which the physical magnitude G is measured to variations in time of said physical magnitude G in application of the following principle:

when the physical magnitude G is varying little or not at all, then measurement instants are spaced out; whereas when the physical magnitude G is varying to a greater extent, then measurements are taken at more frequent intervals.

Patent EP 0 019 672 discloses a method of sampling various physical magnitudes (temperature, pressure, flow rate, . . . ) while samples are being taken by a self-contained tool lowered down an oil well. That method provides for taking measurements of the physical magnitudes concerned at sampling time intervals that are variable so as to optimize tracking of the variations in said physical magnitudes, and for processing the measured data, thereby making more efficient use of a data storage memory that has limited storage capacity.

However, while determining the physical parameter representative of the integral of the physical magnitude G in discrete time, the measured instantaneous value or estimator $G_m$ of said physical magnitude is obtained with a certain amount of error that depends on the specific way in which measurement and/or estimation is done.

Furthermore, the determination of the physical parameter representative of the time integral $V_m$ of the measured physical magnitude $G_m$ is itself generally subject to error, given that it is not possible to know accurately what variations have taken place in the physical magnitude between two measurement instants.

The Applicant has observed that in numerous technical fields, such as the field of metering, where accurate measurements are required and where measurement instants must be as widely spaced apart as possible, e.g. because of problems of data storage capacity or problems of electricity consumption by the sensors and the associated electronic circuits which are powered by one or more electrical batteries of limited capacity, it can be essential to approximate in discrete time and as accurately as possible a physical magnitude G that is capable of varying continuously in time while making sure that a certain predetermined error threshold is not exceeded in the evaluation of the time integral of the measurement of said physical magnitude.

OBJECTS AND SUMMARY OF THE INVENTION

The present invention thus proposes a novel method of determining a physical parameter represented by variation in time of a physical magnitude G that is capable of varying between a minimum value $G_{min}$ and a maximum value $G_{max}$, which method is simple and effective and enables time variations of said physical magnitude G to be tracked while ensuring that any error which occurs in the determination of said physical parameter remains below a predetermined error threshold, while nevertheless spacing measurements instants out as much as possible.

The present invention thus provides a method of determining a physical parameter represented by variation in time of a physical magnitude G capable of varying between a minimum value $G_{min}$ and a maximum value $G_{max}$, the method consisting in measuring said physical magnitude G at variable time intervals referred to as sampling times, in determining after each measurement of the physical magnitude G the corresponding value of the physical parameter, and also the theoretical maximum error that could have occurred in the determination of said physical parameter, and in determining the sampling time prior to each new measurement of said physical magnitude G in such a manner as to ensure that a predetermined error threshold $E_{max}$ is not exceeded while determining the value of the physical parameter corresponding to said new measurement of the physical magnitude G.

Such a method is particularly advantageous. The method of the invention takes account both of the maximum error that could theoretically have occurred previously and of a predetermined error threshold so as to optimize the next sampling time by adapting it as closely as possible to variations in the physical magnitude G, while nevertheless attempting to space out as much as possible the points at which said physical magnitude G is measured. Thus, the method makes it possible to optimize, and generally to reduce significantly, the energy consumption of the measurement circuit (sensor(s) and associated electronics). For example, when the measurement circuit is powered by one or more electrical batteries, presenting a specific electrical capacity and thus a limited lifetime, the method of the invention makes it possible to optimize energy consumption as a function of the constraints set for the measurement (error threshold that must not be exceeded), with such optimization generally leading to a reduction in electricity consumption and thus to an increase in the time during which the assembly constituted by the sensor(s), the associated electronics, and the electric battery(ies) can continue to operate without new batteries. The method of the invention also makes it possible to reduce the number of measurement points and thus to optimize the limited memory storage capacities.

The physical parameter preferably represents the time integral of the physical magnitude.

According to characteristics of the invention:

after each measurement of the physical magnitude G, the variation of said physical magnitude is determined relative to a predetermined threshold $G_s$ and, when the variation in the physical magnitude is greater than said threshold, the theoretical maximum error that could occur in the determination of the corresponding physical parameter is calculated, which error is due to the fact that the sampling times are not short enough to track the variations in said physical magnitude, the sum of the theoretical maximum errors that could have occurred is then calculated for the various successive measurements that have been performed, and said sum is compared with the predetermined error threshold $E_{max}$, and the sampling time is adjusted as a function of the result of said comparison; and for a variation in the physical magnitude that is below the predetermined threshold $G_s$, the values of said physical magnitude as measured are averaged from the instant at which the variation in the physical magnitude began to remain below said predetermined threshold $G_s$, the sum of the theoretical maximum errors that could have occurred for the various successive measurements already performed is calculated, said sum is compared with the predetermined error threshold $E_{max}$, and the sampling time is adjusted as a function of the result of said comparison.

According to other characteristics of the invention:

the sum of said theoretical maximum errors is subtracted from the predetermined error threshold to obtain an error credit;

the greater the error credit, the longer the sampling time;

the sampling time is determined as a function of the error credit and of the greatest variation possible in the physical magnitude, which variation is a function of the minimum and maximum values $G_{min}$, $G_{max}$, and of the most recently measured value of said physical magnitude; and the sampling time lies between a predetermined minimum value $T_s$ and a predetermined maximum value.

According to still further characteristics of the invention:

the sum of the theoretical maximum errors is calculated for a value of the physical parameter represented by variation in time of the physical magnitude G that is not greater than a predetermined value of the physical parameter; and when the predetermined value of the physical parameter is obtained after a series of successive measurements of the physical magnitude G, then account is no longer taken of the respective first value(s) of the theoretical maximum error in calculating the sum of the theoretical maximum errors.

Advantageously, as soon as the predetermined value of the physical parameter has been reached for a series of successive measurements of the physical magnitude, then the respective first value(s) of the theoretical maximum error are eliminated, thereby making it possible to increase the error credit and thus increase the next sampling time.

The present invention also provides apparatus for determining a physical parameter represented by variation in time of a physical magnitude G capable of varying between a minimum value $G_{min}$ and a maximum value $G_{max}$, the apparatus comprising:

measurement means for measuring said physical magnitude G at variable time intervals referred to as sampling times; and means for determining the corresponding value of the physical parameter on the basis of each of said measured physical magnitudes, for determining the theoretical maximum error that could have occurred in the determination of said physical parameter, and for determining the sampling time prior to each new measurement of the physical magnitude, said sampling time being determined so as to ensure that a predetermined error threshold $E_{max}$ is not exceeded while determining the value of the physical parameter corresponding to said new measurement of the physical magnitude.

According to other characteristics of the apparatus:

the apparatus comprises means for comparing variation in the physical magnitude between two successive measurements thereof relative to a predetermined threshold $G_s$;

The apparatus comprises first memory means for storing corresponding successive measurements of the physical magnitude G, sampling times, and theoretical maximum errors;

the first memory means comprise a shift register;

the apparatus comprises second memory means for storing successive values of the physical parameter;

the apparatus further comprises means for summing the stored theoretical maximum errors, for comparing said sum with the predetermined error threshold $E_{max}$, and for determining a sampling time adapted to the result of said comparison; and the apparatus comprises means for determining the value of the physical parameter corresponding to stored successive measurements of the physical magnitude G, the sampling times, and the theoretical maximum errors, and for comparing said value with a predetermined value of the physical parameter, and means for losing the first stored theoretical maximum error(s) from the first memory means when the predetermined value of the parameter has been reached.

A particularly advantageous application of the method of the invention lies in the field of fluid metering, and in particular in the field of determining a volume of gas that has passed along a duct. By way of example, gas flow rate measurements can be performed by means of two spaced-apart ultrasonic transducers that face each other within the duct and that operate alternately as emitter and as receiver.

The measurement stage of the method is performed as follows:

- an ultrasonic signal is emitted from a first transducer towards the second transducer;
- said ultrasonic signal is received at the end of a length of time t known as the propagation time;
- the received signal is amplified and converted into digital form;
- said propagation time or phase shift of the emitted and received ultrasonic signals is measured;
- the preceding stages are repeated with the transducers performing the opposite emitter and receiver roles; and
- the gas flow rate is deduced from the different measured propagation times.

In accordance with the invention, the method can be applied in numerous technical fields in which it is necessary to measure in discrete time a physical magnitude that varies continuously in time (flow rate, temperature, pressure, electrical current, . . . ) and to determine a physical parameter that is represented by the variation in time of said physical magnitude, e.g. the integral of the measured physical magnitude, and to do so in a manner that is as reliable as possible, taking account of the errors that occur during the determination of said physical parameter so as to avoid exceeding a predetermined error threshold.

In flow meters based on the principle of measuring the propagation time or the phase shift of a heat pulse emitted into a fluid by a source and received by a sensor, application of the invention can be particularly advantageous. The instant at which the next heat pulse is to be emitted can be determined as a function both of the measured fluid flow rate and of the error setting.

It can be advantageous to use the invention in a fluid meter of the fluidic oscillator type or in an vortex fluid meter in which the differential pressure (or the flow caused by the differential pressure) due to the oscillation of the fluid jet or to the formation of vortices in the fluid is firstly detected by one or more sensor(s), and in which electronic means associated with said sensor(s) serve secondly to determine the volume that has passed through said meter on the basis of said pressure. The method of the invention thus makes it possible to reduce the energy consumption of the sensor by spacing out as much as possible the instants at which said sensor is powered, taking account in particular of any available error credit.

The invention may also be applied to road traffic by evaluating the number of vehicles passing in a determined period, in particular for the purpose of evaluating road traffic through a toll point. For this purpose, the next instant at which vehicle flow is measured is adjusted as a function both of the variation possible in the flow and of the error level that has been set.

BRIEF DESCRIPTION OF THE DRAWINGS

Other characteristics and advantages appear from the following description given purely by way of non-limiting example and made with reference to the accompanying drawings, in which.

MORE DETAILED DESCRIPTION

Figure 1:
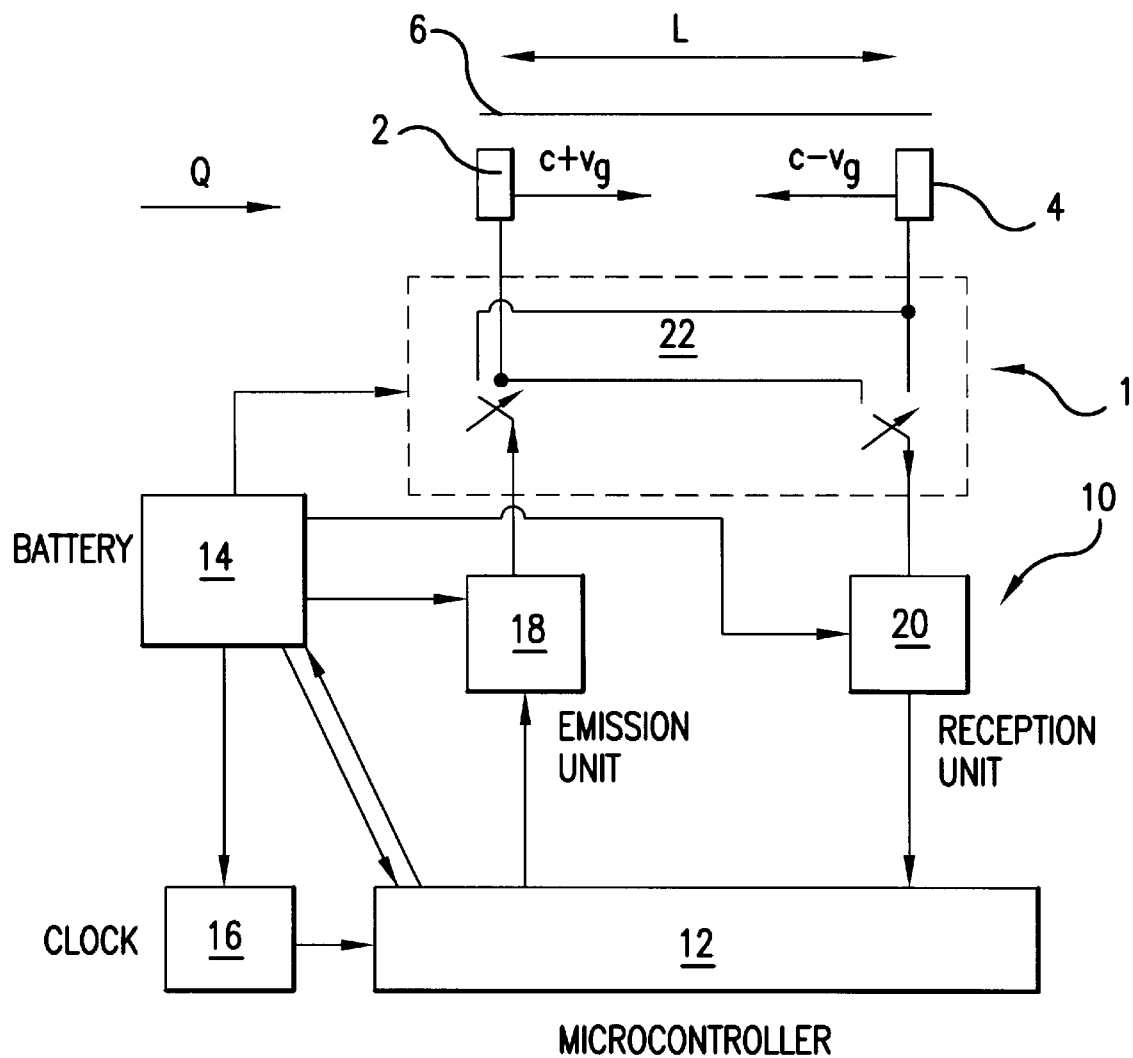
FIG. 1 is a block diagram of a gas meter and an associated electronics unit enabling the method of the invention to be implemented.

As shown in FIG. 1 and given overall reference 1, a fluid meter, and more particularly an ultrasonic gas meter, comprises two ultrasonic transducers 2 and 4, e.g. of the piezoelectric type that are mounted facing each other in a duct 6 along which there flows a gas in which it is desired to measure a physical magnitude, and in particular its flow rate. The ultrasonic transducers 2 and 4 are spaced apart by a distance L.

The velocity of the gas is written vg and the flow rate of the gas varies continuously in time between two extreme values $Q_{min}$ and $Q_{max}$. In the present case, the two values $Q_{min}$ and $Q_{max}$ determine the range over which the meter is capable of performing measurements, and $Q_{min}$ is equal to zero.

In an implementation of the invention, the method seeks to determine the physical parameter that is represented by the time integral of the gas flow rate, i.e. the volume of gas, while tracking as closely as possible variations in the flow rate so that errors that occur while determining the volume remain below a predetermined error threshold, while nevertheless spacing out as much as possible the instants at which the flow rate is measured.

In general, at a given instant, the flow rate of the gas is measured, and then the volume of gas which has flowed through the meter up to said instant is determined.

Figure 2:
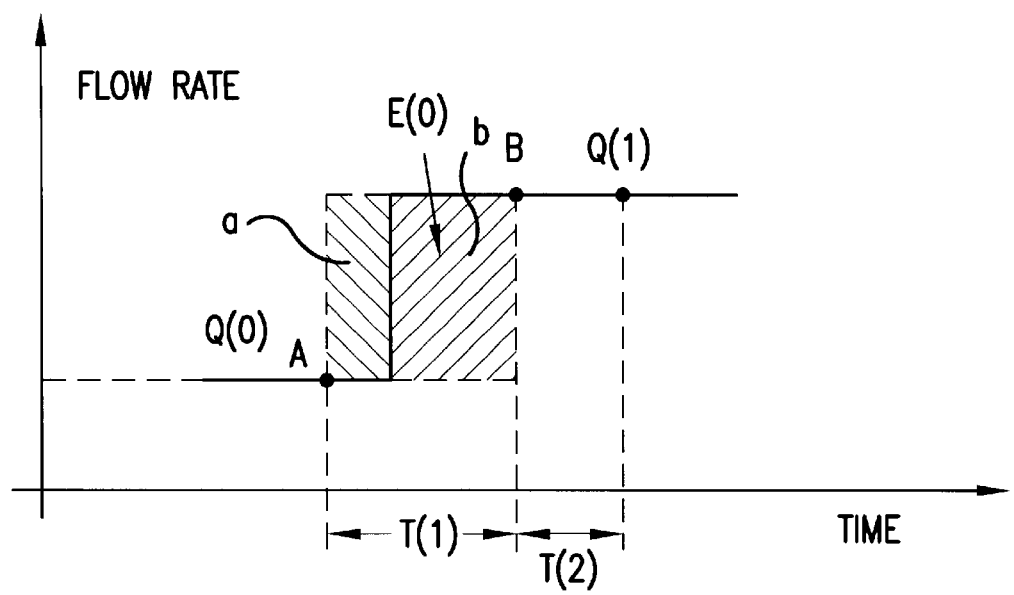
FIG. 2 is a graph showing a first example of how gas flow rate may vary as a function of time.

The following example which is illustrated in FIG. 2 serves to explain the principles on which the invention is based. In FIG. 2, the flow rate of the gas is shown as changing by stepping suddenly between steady portions at different levels, with the gas flow rate changing from a first value Q(0) to a second value Q(1) that is greater than Q(0). Assuming that the most recent flow rate measurement corresponds to point A and that the new flow rate measurement corresponds to point B, then it can be seen that a real error occurs in the determination of the volume of gas which has flowed between the two corresponding instants, i.e. for measured flow rate values Q(0) and Q (1) spaced apart by a "sampling" time interval T(1), and that the real error is represented by shaded area b. Unfortunately, given that the sampling time T(1) is not short enough to track the variations in the gas flow rate closely, it is not possible to know accurately the real error that has occurred in the determination of gas volume between A and B.

Advantageously, the method of the invention provides for estimating a first theoretical maximum error E(0) that could have occurred during determination of the volume of gas in the event of the flow rate changing from value Q(0) to value Q(1). This error is represented by the sum of the shaded areas a and b in FIG. 2. This theoretical maximum error is then compared with the predetermined error threshold $E_{max}$, and if the error is less than $E_{max}$, then the error is subtracted from said predetermined error threshold $E_{max}$ in order to obtain an error credit $E_{max}-E(0)$. As a function of this error credit, a sampling time is determined which is the longest possible time that can theoretically be allowed before the next flow rate measurement while ensuring that said error credit is not exceeded, with this determination being done while taking account both of the most recent flow rate measurement Q(1) and of the greatest variation possible in the flow rate starting from said most recent measurement Q(1).

The greatest possible variation in the flow rate is a function of the minimum and maximum flow rate values $Q_{min}$ and $Q_{max}$, i.e. of 0 and $Q_{max}$ in the present example; The new sampling time T(2) is then expressed as follows:

$$T(2) = \frac{E_{\max-E(0)}}{|Q(1) - Q_{\max}/2| + Q_{\max}/2}$$

where the expression $|Q(1)-Q_{max}/2|+Q_{max}/2$ represents the greatest possible variation in the flow rate starting from the flow rate Q(1).

The sample time lies between a predetermined minimum value and a predetermined maximum value. The minimum value $T_s$ corresponds to the smallest possible time difference between two consecutive measurements of the flow rate and it is set by the time required to measure the flow rate and to determine the volume of the gas. In general, the sampling time is then expressed as an integral multiple N of $T_s$, i.e. $T=NT_s$.

By way of a worked example, Q(0)=0, $Q_{max}$=6000 liters per hour (I/h), and it is assumed that the predetermined error threshold is such that an error of 0.5% is acceptable with respect to a predetermined volume of gas referred to as the calibration volume and equal to 100 liters. Consequently, the error threshold is equal to 0.5 liters.

Starting from a zero flow rate, the maximum possible variation in flow rate is 6000 I/h, and consequently for an error threshold set at 0.5 I, that gives a sampling time $T(1)=0.5/6000=8.33+10^{-5}h$. Assuming that $T_s$=50 ms, then $T(1)=6T_s$.

It is now assumed that the flow rate changes from zero to Q(1)=4000 I/h during the sampling time $T(1)=6T_s$. Under such circumstances, the theoretical maximum error E(0) that could arise in calculation of the volume of gas using the formula $V=Q(1)+6T_s$, is equal to $6T_s/3600\times4000$, i.e. 0.334 liters. This error is less than the error threshold of 0.5 I, so for performing the following measurement there remains an error credit of (0.5−0.334), i.e. 0.166 liters. Consequently, the following sampling time T(2) is determined so that the worst-case variation in flow rate cannot give rise to an error of more than 0.166 liters.

This sampling time is written:

$$T(2) = \frac{0.5 - 0.334}{|4000 - 6000/2| + 6000/2}$$

i.e. $T(2) = \frac{0.166}{4000} = 3T_s$

It can be seen from the above worked example that the sampling time has been halved compared with the first value $T(1)=6T_s$, however that has made it possible to preserve maximum error credit. More generally, for each new flow rate measurement, the corresponding volume of gas is determined together with the theoretical maximum error that could have occurred in the determination of said volume. This error is added to the errors that have previously been determined and the resulting sum is compared with the predetermined error threshold $E_{max}$ so as to find out whether there remains any error credit that would allow flow rate measurement instants to be spread out while still ensuring that said error threshold $E_{max}$ is not exceeded.

Figure 3:
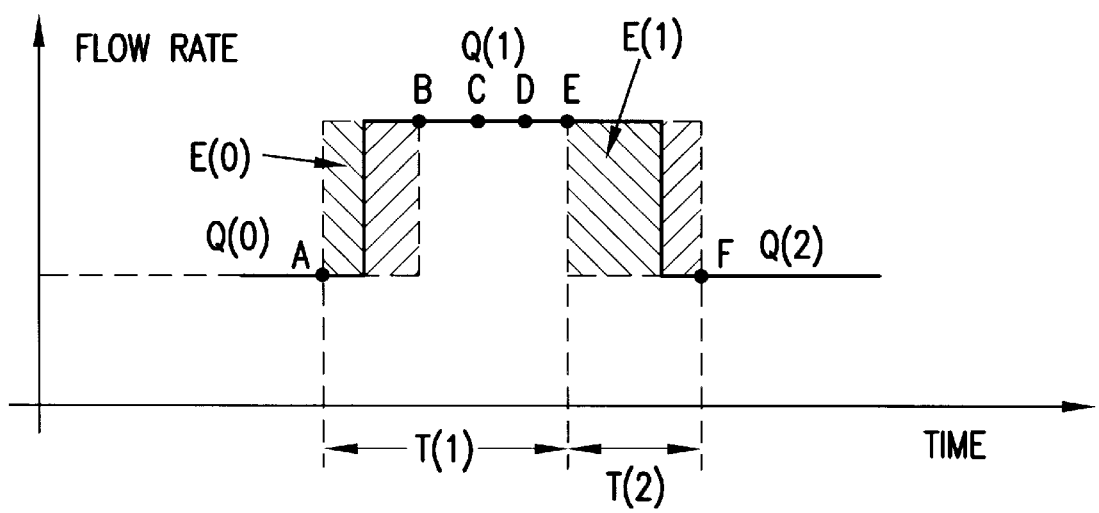
FIG. 3 is a graph showing a second example of how gas flow rate may vary as a function of time.

FIG. 3 shows another possible variation in the flow rate of the gas as a function of time in which two successive changes in gas flow rate follow each other, thereby showing up another advantage of the method of the present invention.

In FIG. 3, the gas flow rate varies from the value Q(0), which value was obtained at point A, to the value obtained at point B, which is associated with a theoretical maximum error E(0) that could have occurred in the determination of gas volume between the two consecutive measurements instants. The following sampling time is set in the manner described above with reference to FIG. 2. In the present case, it happens that three successive flow rate measurements corresponding to points C, D, and E all provide a value that is taken to be the same as the value Q(1) since the variations in flow rate about the first value obtained at point B are smaller than a minimum detection threshold $Q_s$. This threshold $Q_s$ corresponds to the smallest flow rate difference that is measurable by the method.

The gas flow rate is thus constant for a while and the value corresponding to the flow rate during this period Q(1) is refined by the four successive measurements obtained at points B, C, D, and E for the duration T(1) of said period. The corresponding gas volume is $Q(1)\times T(1)$ and it is added to the old volume as already determined at point A. At the end of time T(1), after averaging the flow rate over the period of constant flow rate, the next sampling time is determined as a function of the available error credit $E_{max}-E(0)$, which credit has not changed since no error has taken place since the change between points A and B, and on the basis of the greatest possible change in flow rate that can occur starting from Q(1), namely $|Q(1)-Q_{max}/2|+Q_{max}/2$.

As shown in FIG. 3, at the end of sampling time T(2), a new flow rate value Q(2) is measured and the corresponding gas volume $T(2)\times Q(2)$ is determined, thereby making it possible that a theoretical maximum error E(1) has occurred, which error is calculated. This error E(1) is equal to $T(2)\times[Q(2)-Q(1)]$ and it is negative, that is to say the volume of gas is overestimated compared with the real volume that has passed through the gas meter. In contrast, during the preceding change in gas flow rate from Q(0) to Q(1), the volume of gas was underestimated.

Thus, advantageously, when the theoretical maximum errors are summed to discover the available error credit, the errors will cancel to some extent, thereby unexpectedly increasing the error credit and thus making it possible to space out subsequent measurement times.

A detailed embodiment is described below with reference to FIGS. 1 and 3 to 8.

An electronics unit 10 is shown diagrammatically in FIG. 1 and it has the functions firstly of electrically powering the various functional units described below and secondly of controlling the method of the invention for determining the integral of gas flow rate. The electronics unit 10 comprises a microcontroller 12 connected to a source of electrical energy 14 (e.g. a battery) and to a crystal clock 16 operating at a frequency of 10 MHz, for example, and likewise powered by the energy source 14. The microcontroller 12 is also connected to two units, an emission unit 18 and a reception unit 20, both of which are powered by the energy source 14. By way of example, the emission unit 18 comprises a digital-to-analog converter and an operational amplifier, while the reception unit 20 comprises an operational amplifier and an analog-to-digital converter. The electronics unit 10 also includes a switching circuit 22 powered by the energy source 14 and connected firstly to the emission and reception units 18 and 20, and secondly to the two ultrasonic transducers 2 and 4.

Figure 4:
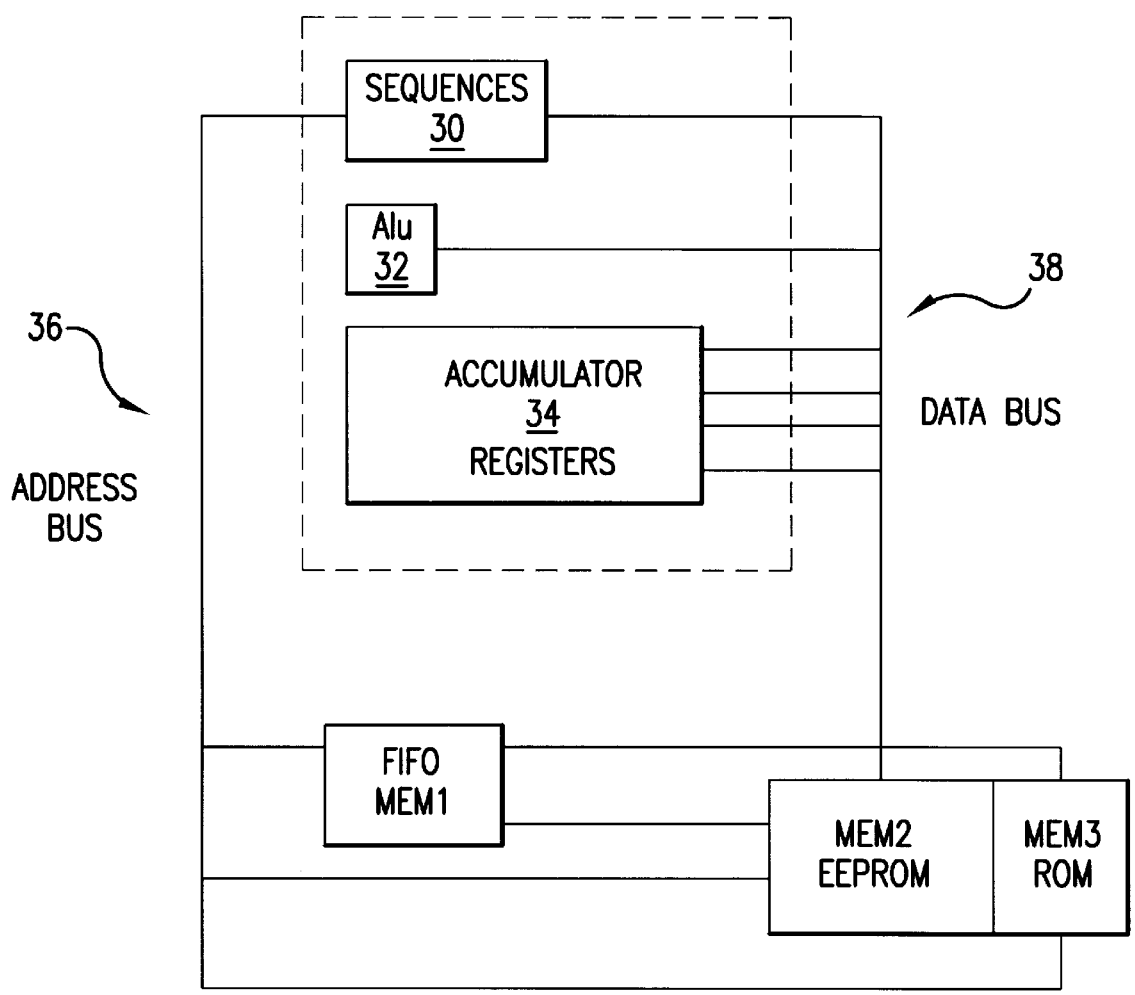
FIG. 4 is a block diagram on a larger scale of a microcontroller that forms a portion of the electronics unit in FIG. 1.

As shown in FIG. 4, the microcontroller 12 comprises a sequencer 30, an arithmetic and logic unit 32, accumulator registers 34 in which the various calculations are performed and in which the results of the calculations are stored temporarily, and first memory means for storing the corresponding flow rate, sampling time, and theoretical maximum error, which means are constituted by a first-in-first-out (FIFO) type read/write memory made up of shift registers and referred to below as MEM1.

The microcontroller 12 a shown in FIG. 4 also comprises second memory means for storing gas volume and constituted by an electrically erasable programmable read-only memory (EEPROM) type memory referred to below as MEM2. A read-only memory (ROM) referred to below as MEM3 contains the instructions that enable gas volume to be determined in real time in application of the invention. An address bus 36 connects the sequencer 30 to the various memories MEM1, MEM2, and MEM3. A data bus 38 connects together the sequencer 30, the arithmetic and logic unit 32, each of the accumulator registers 34, and each of the memories.

Figure 5:
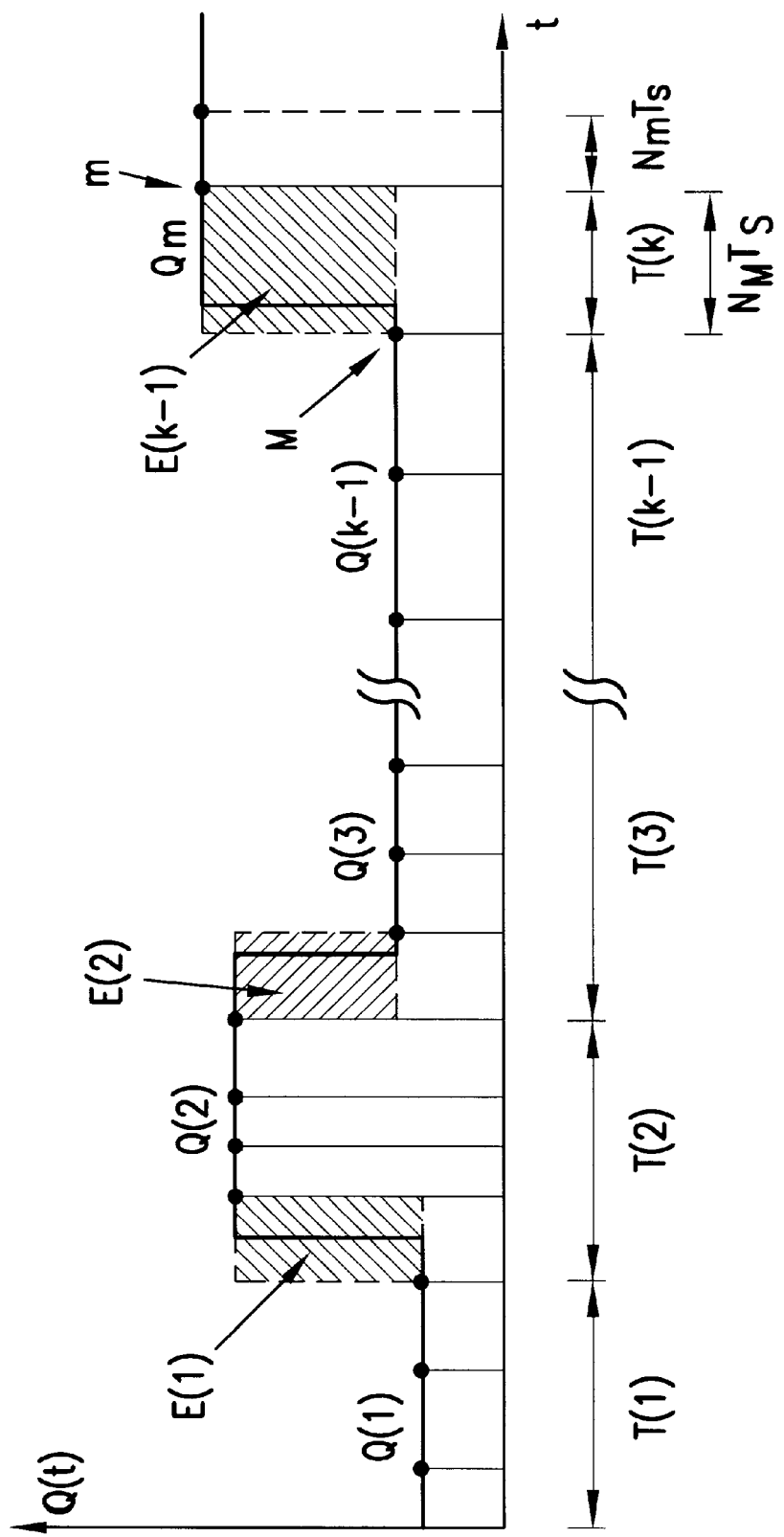
FIG. 5 is a graph showing a third example of how gas flow rate may vary as a function of time.

FIG. 5 is a graph showing one example of how gas flow rate may vary over time. For the purposes of simplification, this graph shows flow rate as varying between steady levels only, but it will naturally be understood that the method is applicable to any type of variation in flow rate. Each level corresponds to an average flow rate value Q(1), Q(2), . . . , as a function of the various flow rate measurements performed, a time value T(1), T(2), . . . , representative of the duration of the constant portion of a level and obtained by summing the sampling times that have elapsed between each of said successive flow rate measurements, and a theoretical maximum error E(1), E(2), . . . , that could have occurred in the determination of gas volume on changing from one level to the next.

Figure 6A:
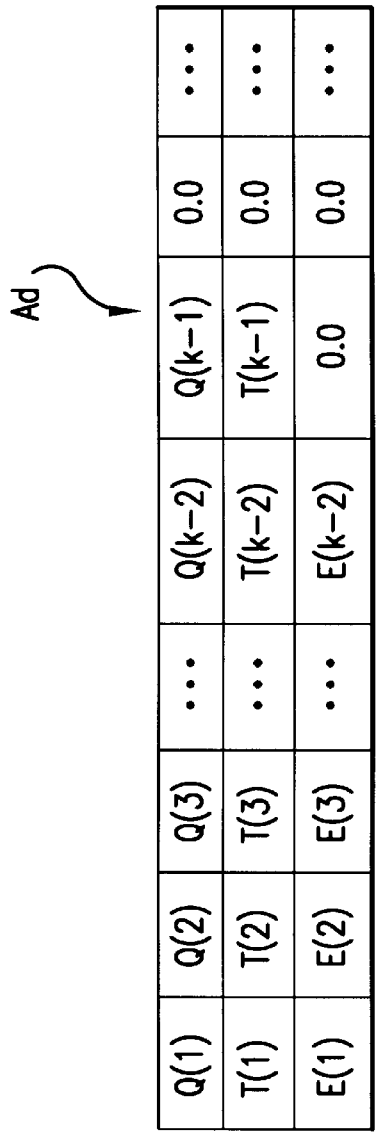
FIGS. 6a and 6b are tables representing the shift registers of a read/write memory MEM1 integrated in the FIG. 4 microcontroller, showing their contents at two different instants in the method of the invention.

Each of the flow rates, times, and error values defined above is stored in one of the registers of memory MEM1, as shown in FIG. 6a. Assume that the most recent flow rate measurement corresponds to point M on the flow rate graph of FIG. 5, and that as a result the most recently stored values in the memory MEM1 correspond to values Q(k−1) and T(k−1) stored at the current write address Ad (see FIG. 6a). In the explanation below, Q(Ad) and T(Ad) designate the most recently memorized values and the index m given to flow rate Q and to volume V indicate respectively the flow rate value that has just been measured, and the gas volume that has just been determined on the basis of said flow rate value $Q_m$.

While the method is being performed, the sequencer uses the address bus 36 to read the series of instructions contained in the memory MEM3 that define the method of the invention.

Figure 7:
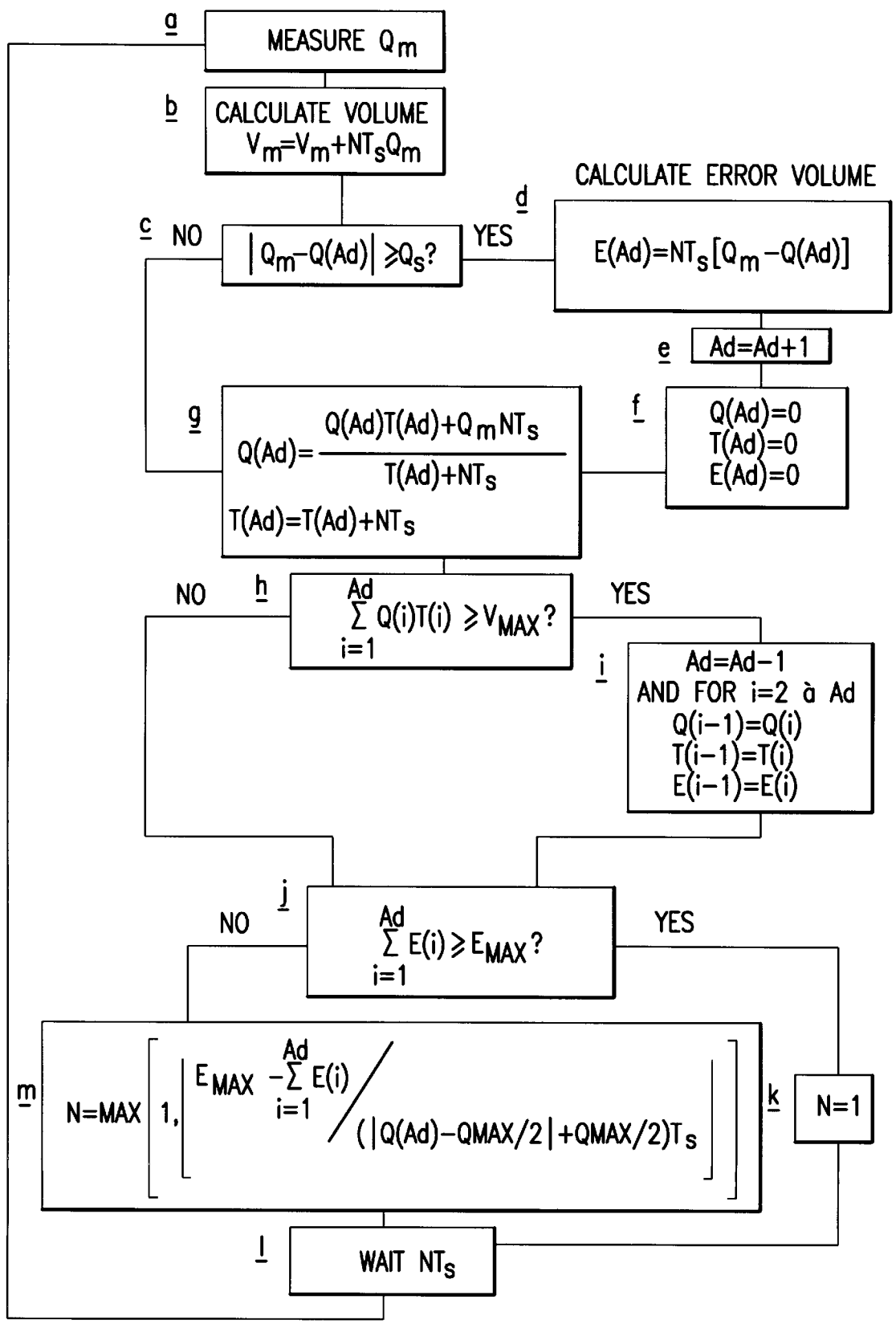
FIG. 7 is a flow chart showing the various stages of the method in an implementation of the invention.

The electronics unit 10 allows a time NMTS to elapse after the most recent measurement corresponding to point M before a new measurement of gas flow rate Qm is performed at point m (FIG. 5). The sampling step $N_M$ has been determined by the method on the basis of results obtained during flow rate measurement at point M, and said pitch may vary from one measurement to another. To clarify the explanation, successive sampling steps determined respectively after the flow rate measurements at points M and m are distinguished by respective indices M and m, even though the sampling step shown in FIG. 7 is designated solely by the letter N.

After measuring the flow rate $Q_m$, the method of the invention determines the new sampling time $N_m T_s$ to be adopted for performing the next flow rate measurement. A measurement is triggered as follows: the sequencer 30 activates the emission unit 18 to send an electrical signal to one of the transducers 2, it also activates the electrical energy source 14 which controls the switching circuit 22, thereby establishing connections between said emission unit 18 and said transducer 2, and also between the reception unit 20 and the other transducer 4.

The electrical signal excites the transducer 2 which emits a train of ultrasonic waves through the gas at speed C in the gas flow direction at the specific instant marked by the clock 16 (FIG. 1). After a length of time t1 as determined by the clock 16, the transducer 4 receives the train of ultrasonic waves. The sequencer 30 then causes the switching circuit 22 to change over so that firstly the emission unit 18 is now connected to the transducer 4, and secondly the reception unit 20 is connected to the transducer 2. In the same manner, a second train of ultrasonic waves is emitted by the transducer 4 towards the transducer 2 in the opposite direction to the gas flow direction, and the clock determines the time t2 required for said second train of ultrasonic waves to propagate (FIG. 1).

Given that the propagation times to and t2 are expressed by the following relationships:

$$t=L/(c-vg) \quad t2=L/(c+vg)$$

the arithmetic and logic unit 32 calculates the velocity vg of the gas as follows:

$$Vg = \frac{L}{2}\left[\frac{1}{t_2} - \frac{1}{t_1}\right]$$

and gas flow measurement $Q_m$ is deduced therefrom as follows:

$$Q_m = S\frac{L}{2}\left[\frac{1}{t_2} - \frac{1}{t_1}\right]$$

where S represents the internal section of the duct 6.

This measurement stage corresponds to stage a of the method of the invention as shown in the flow chart of FIG. 7. The arithmetic and logic unit 32 then calculates the integral of the gas flow rate measurement Qm by applying the expression:

$$V_m = V_m + N_M T_s Q_m$$

i.e. it takes the old value $V_m$ of the integral as obtained for the preceding gas flow rate measurement and stored in the memory MEM2, and it adds thereto the product $N_M T_s Q_m$ (stage D in FIG. 7). Thereafter, the old value of integral $V_m$ is replaced in the memory MEM2 by the value as newly calculated in this way. This value is an absolute value of gas volume.

The following stage of the method consists in verifying whether a detectable transition in gas flow rate has occurred between the two most recent values $Q_m$ and Q(Ad). The arithmetic and logic unit 32 thus calculates the expression:

$$|Q_m - Q(Ad)|$$

and compares it with the predetermined threshold value $Q_s$ stored in the memory MEM3 (stage c).

Two situations can then arise:

a) either $|Q_m-Q(Ad)| \geq Q_s$, which means that the gas flow rate has varied significantly, as shown in FIG. 5;

b) or $|Q_m-Q(Ad)| < Q_s$, in which case no variation in gas flow rate can be detected.

As shown in FIG. 5, the increase in gas flow rate from the value $Q(k-1)[=Q(Ad)]$ to the value $Q_m$ could theoretically have given rise during the most recent calculation of the flow rate integral $V_m$ to an error $E(k-1)[=E(Ad)]$ that is marked by the shaded area in FIG. 5. The theoretical maximum error that could have occurred during said transition in flow rate is given by the following formula:

$$E(Ad)=NT_s[Q_mb-Q(Ad)]$$

(stage d), and this value is stored in the memory MEM1 at write address Ad (FIG. 6a) at which address there are already stored the values Q(Ad) and T(Ad).

The write address in the memory MEM1 is then incremented (stage e) by the sequencer 30 so that Ad=Ad+1, and the values of Q, T, and E at the new write address Ad are initialized to 0 (stage f).

Figure 6B:
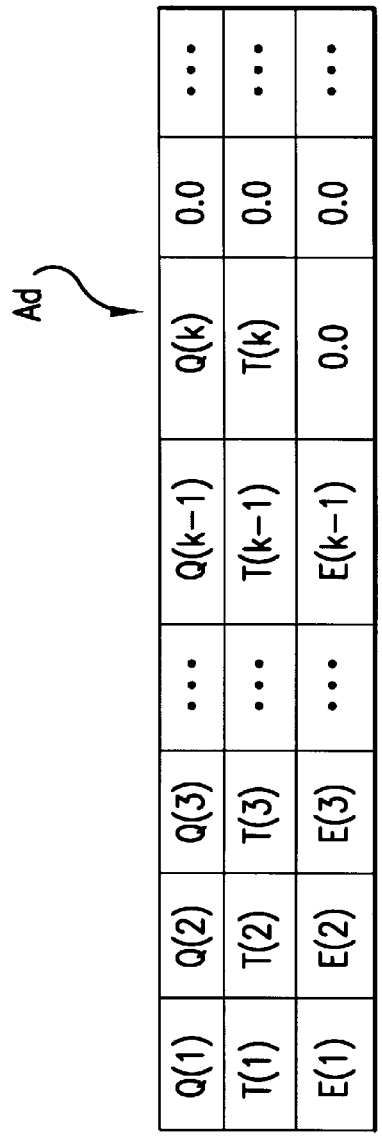

The arithmetic and logic unit 32 then calculates the new values of Q and T to be stored at the new write address Ad in stage g, where:

$$Q(k) = Q(Ad) = \frac{Q(Ad)T(Ad) + QmNTs}{T(Ad) + NTs} = Qm$$

and $$T(k)=T(Ad)=T(Ad)+N_MT_s=N_MT_s$$

and these values are stored in the memory MEM1 as can be seen in FIG. 6b.

In above-mentioned case b), and as already described with reference to FIG. 3, the flow rate measurement $Q_m$ is on a level portion given that no variation in flow rate has been observed. This case can be seen with reference to FIG. 6a which shows the memory state of the memory MEM1 after the most recent flow rate measurement has been performed. The corresponding stage g of the method of the invention consists in refining the gas flow rate measurement by averaging using the preceding measurement as stored at address Ad:

$$Q(k-1) = Q(Ad) = \frac{Q(Ad)T(Ad) + QmN_M Ts}{T(Ad) + N_M Ts}$$

and in incrementing the duration of the level:

$$T(k-1)=T(Ad)=T(Ad)+N_MT_s.$$

The values Q(Ad) and T(Ad) calculated in this way are stored at write address Ad in the memory MEM1 and refine the older values Q(k−1) and T(k−1) (FIG. 6a).

It should be observed that when a flow rate transition is detected (case a), it is not necessary to use the formulas preceding stage g giving the new values of Q and T, and it suffices to record the values $Q_m$ and $N_MT_s$. However, from the algorithmic point of view (FIG. 7) it may be advantageous to provide for a single operation (stage g) covering both cases referenced above at a) and at b).

In stage h of the method, the arithmetic and logic unit 32 of the microcontroller 12 calculates the sum of the gas volumes measured from the earliest values Q(1) and T(1) stored in the memory MEM1 up to the most recent values Q(Ad) and T(Ad). This sum is then compared with the predefined calibration volume $V_{max}$ that is stored in the memory MEM3. This leads to two possibilities in stage h. Either:

$$\sum_{i=1}^{Ad} Q(i)T(i) \geq V_{max}$$

in which case the sequencer 30 shifts all of the registers in the memory MEM1 by one unit so that Ad=Ad−1, and for i=2 to Ad, Q(i−1)=Q(i), T(i−1)=T(i), E(i−1)=E(i) (stage i). The first values Q(1), T(1), and E(1) are thus lost. This makes it possible to reduce the sum of the theoretical maximum errors:

$$\sum_{i=1}^{Ad} E(i)$$

thereby making it possible for the sum to remain below the error threshold $E_{max}$ which makes it possible to increase error credit and thereby space apart the following measurement instants. Alternatively:

$$\sum_{i=1}^{Ad} Q(i)T(i) < V_{max}$$

in which case the method proceeds directly with the following stage j.

After considering both possibilities in stage h, the arithmetic and logic unit 32 then calculates the sum of the theoretical maximum errors:

$$\sum_{i=1}^{Ad} E(i)$$

that could have occurred since the oldest values stored in the memory MEM1, and it compares this sum with the predetermined error threshold $E_{max}$ (stage j) as stored in the memory MEM3. This threshold is set for the value $V_{max}$ of the calibration volume, and it means that a maximum error of $E_{max}$ is acceptable in the determination of a volume of gas that is equal to $V_{max}$.

If the sum:

$$\sum_{i=1}^{Ad} E(i)$$

is greater than the error threshold $E_{max}$, then the sampling step $N_m$ to the following measurement is set at 1 (stage k) and the microcontroller allows one sampling time $T_s$ to elapse prior to powering the two units 18 and 20 and the switching circuit 22 so as to proceed with a new flow rate measurement. Under such circumstances, even though all of the error credit has been used up when the new flow rate measurement is made after sampling time interval $T_s$, it is still appropriate after the new measurement to recalculate the sum of the theoretical maximum errors that may have occurred, since, as outlined above, the sum is algebraic and it is possible that the errors may cancel in part. Thus, even if the system is over the maximum authorized error threshold when it performs the measurement, it is quite possible that it will find itself back below the threshold as a result of the following measurement. Under such circumstances, the method enables the following sampling step to be optimized by taking account of error credit so as to avoid exceeding the maximum authorized threshold $E_{max}$.

Otherwise, if the sum:

$$\sum_{i=1}^{Ad} E(i)$$

is less than the error threshold $E_{max}$, then the sampling step is given by the formula in the following stage m which also takes account of the most recent measurement of the flow rate Q(Ad):

$$N_m = \max\left[1, \left[E_{max-\sum_{i=1}^{Ad} E(i)} \bigg/ (|Q(Ad) - Q_{max}/2| + Q_{max}/2)T_s\right]\right]$$

A new measurement flow rate is then triggered after sampling time $N_m T_s$, as shown in FIG. 5. A particular example of gas flow rate variation is given in FIG. 8.

This figure shows what happens when the calibration volume has nearly been reached at measurement point A for a theoretical maximum error sum that is close to the predetermined error threshold $E_{max}$. For a current flow rate measurement $Q_m$ corresponding to point B, the determination of the corresponding gas volume $V_m$, the theoretical maximum error E(k−1) that could have occurred during the determination of said volume, the storing of the values Q, T, and E, and the incrementation of the sum:

$$\sum_{i=1}^{Ad} Q(i)T(i)$$

by the volume $Q_m NT_s$ corresponding to the values store in the memory MEM1 are all performed as explained with reference to stages a to h of the method as described above with reference to FIGS. 1 and 3 to 7.

Figure 8:
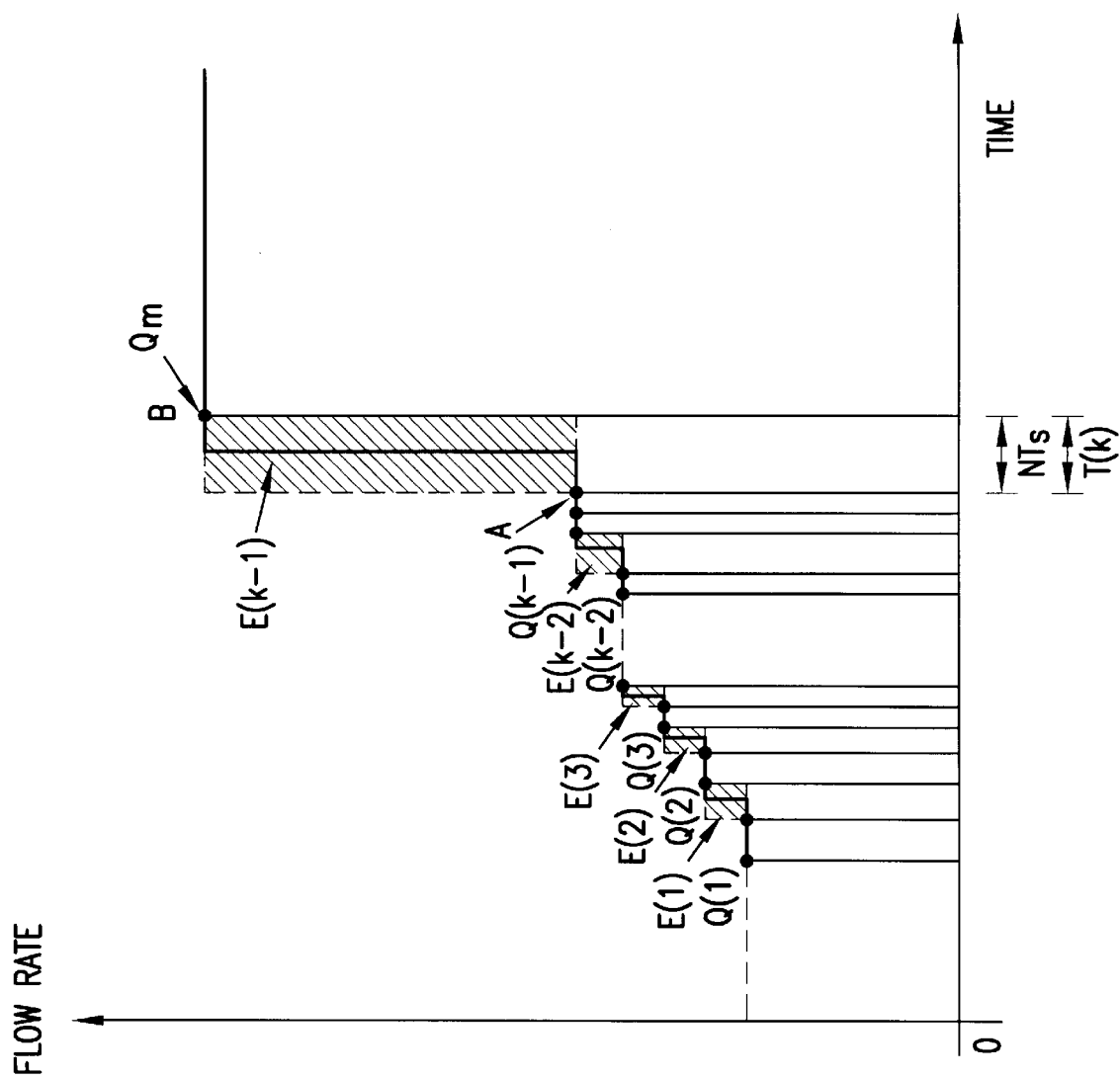
FIG. 8 is a graph representing a fourth example of how gas flow rate may vary as a function of time.

However, in the particular case of FIG. 8, the new sum:

$$\sum_{i=1}^{Ad} Q(i)T(i)$$

incremented by the most recent volume $Q_m NT_s$ is much greater than the calibration volume $V_{max}$. Under such circumstances, merely shifting all of the registers in the memory MEM1 by one unit, thereby losing the first values Q(1), T(1) and E(1) (stage i), would have the result that the sum:

$$\sum_{i=1}^{Ad} Q(i)T(i)$$

as performed on the next flow rate measurement would still be greater than the calibration volume and that can be penalizing since more errors are being taken into account than is necessary.

Thus, in a variant of the invention, it is particularly advantageous to shift the registers of the memory MEM1 through one unit and then recalculate the sum:

$$\sum_{i=1}^{Ad} Q(i)T(i)$$

immediately, and shift said registers again if the new sum is not less than the calibration volume. Consecutive first values of Q, T, and E are thus lost, and consequently a plurality of theoretical maximum error values are lost.

During the following stage j, the sum of the theoretical maximum errors is then calculated on the basis of a volume that is smaller than the calibration volume $V_{max}$. This variant makes it possible to reduce the energy consumption of the gas meter because the error credit will also be increased by the above operation, thereby making it possible for following measurement instants to be more widely spread out in time.

We claim:

1. A method of determining a physical parameter represented by variation in time of a variable physical magnitude G between a minimum value $G_{min}$ and a maximum value $G_{max}$, the method comprising the steps of:

measuring said physical magnitude G at variable time intervals referred to as sampling times, determining after each measurement of the physical magnitude G, the corresponding value of the physical parameter representing the time integral of the physical magnitude, and also the variation of said physical magnitude relative to a predetermined threshold $G_s$, calculating the theoretical maximum error that could occur in the determination of the corresponding physical parameter, when the variation in the physical magnitude is greater than said threshold, said error being due to the fact that the sampling times are not short enough to track the variations in said physical magnitude, the sum of the theoretical maximum errors that could have occurred is then calculated for the various successive measurements that have been performed, and said sum is compared with a predetermined error threshold $E_{max}$, and adjusting the sampling time prior to each new measurement of said physical magnitude G as a function of the result of said comparison so that the predetermined error threshold $E_{max}$ is not exceeded while determining the value of the physical parameter corresponding to said new measurement of the physical magnitude G.

2. A method according to claim 1, wherein for a variation in the physical magnitude that is below the predetermined threshold $G_s$, the values of said physical magnitude as measured are averaged from the instant at which the variation in the physical magnitude began to remain below said predetermined threshold $G_s$, the sum of the theoretical maximum errors that could have occurred for the various successive measurements already performed is calculated, said sum compared with the predetermined error threshold $E_{max}$, and the sampling time is adjusted as a function of the result of said comparison.

3. A method according to claim 1, wherein the sum of said theoretical maximum errors is subtracted from the predetermined error threshold to obtain and error credit.

4. A method according to claim 3, wherein the greater the error credit, the longer the sampling time.

5. A method according to claim 3, wherein the sampling time is determined as a function of the error credit and of the greatest variation possible in the physical magnitude, which variation is a function of the minimum and maximum values $G_{min}$, $G_{max}$, and of the most recently measured value of said physical magnitude.

6. A method according to claim 1, wherein the sampling time lies between a predetermined minimum value $T_s$ and a predetermined maximum value.

7. A method according to claim 1, wherein the sum of the theoretical maximum errors is calculated for a value of the physical parameter represented by variation in time of the physical magnitude G that is not greater than a predetermined value of the physical parameter.

8. A method according to claim 3, wherein, when the predetermined value of the physical parameter is obtained after a series of successive measurements of the physical magnitude G, then account is no longer taken of a respective first value(s) of the theoretical maximum error(s) in calculating the sum of the theoretical maximum errors.

9. Apparatus for determining a physical parameter represented by variation in time of a variable physical magnitude G between a minimum value $G_{min}$ and a maximum value $G_{max}$, the apparatus comprising:

measurement means for measuring said physical magnitude G at variable time intervals referred to as sampling times, means for determining the corresponding value of the physical parameter representing the time integral of the physical magnitude, on the basis of each of said measured physical magnitudes, means for determining the variation of the physical magnitude between two successive measurements thereof relative to a predetermined threshold $G_s$, means for calculating the theoretical maximum error that could occur in the determination of the corresponding physical parameter, when the variation in the physical magnitude is greater than the threshold, said error being due to the fact that the sampling times are not short enough to track the variations in said physical magnitude, means for calculating the sum of the theoretical maximum errors that could have occurred for the various successive measurements that have been performed, means for comparing said sum with a predetermined error threshold $E_{max}$, and means for determining the sampling time prior to each new measurement of the physical magnitude, said sampling time being determined so as to ensure that the predetermined error threshold $E_{max}$ is not exceeded while determining the value of the physical parameter corresponding to said new measurement of the physical magnitude.

10. Apparatus according to claim 9, comprising first memory means for storing corresponding successive measurements of the physical magnitude G, sampling times, and theoretical maximum errors.

11. Apparatus according to claim 10, wherein the first memory means comprise a shift register.

12. Apparatus according to claim 11, comprising means for determining the value of the physical parameter corresponding to stored successive measurements of the physical magnitude G, the sampling times, and the theoretical maximum errors, and for comparing said value with a predetermined value of the physical parameter, and means for erasing a first stored theoretical maximum error(s) from the first memory means when the predetermined value of the parameter has been reached.

13. Apparatus according to claim 10, further comprising means for summing the stored theoretical maximum errors, for comparing said sum with the predetermined error threshold $E_{max}$, and for determining a sampling time adapted to the result of said comparison.

14. Apparatus according to claim 9, comprising second memory means for storing successive values of the physical parameter.

* * * * *